Patented Aug. 25, 1936

2,052,281

UNITED STATES PATENT OFFICE 2,052,281

PROCESSES FOR BREAKING PETROLEUM EMULSIONS

Melvin De Groote, St. Louis, Mo., assignor to Tretolite Company, Webster Groves, Mo., a corporation of Missouri No Drawing. Application December 21, 1935, Serial No. 55,618

4 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings."

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent used in my present process consists of a chemical compound characterized by the presence of both an oxy-octadecadiene acid residue and a dicarboxy acid residue in the same molecule; said dicarboxy acid residue being derived from an acid of the formula type $(CH_2)_n(COOH)_2$, in which $n$ has a value of at least 5 and not more than 8.

In U. S. Letters Patent No. 2,023,997 to Melvin De Groote and Bernhard Keiser, dated December 10, 1935, there is described a process for breaking emulsions by means of oxy-octadecadiene acid bodies. As stated in said patent, octadecadiene acid is a material of the following formula:

It is commonly referred to as octadecadiene-9, 11-acid-1. This is the particular isomer derived from castor oil or ricinoleic acid, and hereinafter the expression "octadecadiene acid" will refer to this particular acid, insofar that it is the one which is commercially available.

As stated in U. S. Letters Patent No. 1,920,585, to Ott and Schussler, dated August 1, 1933, it is obtainable by splitting off water from ricinoleic acid ($C_{18}H_{34}O_3$) of the formula:

In producing the demulsifying agent employed in my present process, octadecadiene acid of suitable purity may be subjected to oxidation by any of the methods conventionally used for the oxidation of castor oil and the like. My preference is to oxidize octadecadiene acid at a relatively low temperature by means of moist air under pressure. I also prefer to use a temperature of 125° to 135° C., and use approximately 45 to 75 lbs. gauge pressure. If desired, octadecadiene acid may be oxidized at a higher temperature by means of air or oxygen at atmospheric pressure. Furthermore, it may be oxidized in the presence of an inert material, if more convenient to reduce the viscosity during oxidation by means of such added material.

I have referred to the product obtained by oxidizing octadecadiene acid as "oxy-octadecadiene acid". The expression "oxy-octadecadiene acid" is intended to refer to the derivatives in which additional oxygen has been introduced into the molecule, for instance, as indicated by the formula $C_{18}H_{32}O_3$. This represents the saturation of an ethylene linkage, or perhaps, the partial saturation of two ethylene linkages, or the formation of a new ethylene linkage by means of an added oxygen atom. I do not know exactly the composition of the product obtained by the initial oxidation of octadecadiene acid. The reaction or reactions presumably are comparable to the saturation of conjugated double bonds by halogens or similar reagents. Under such circumstances a new ethylene linkage may be created. (See "Textbook of Organic Chemistry", by Bernthsen, 1931 edition, page 840.) It is believed that oxidation, especially with moist air, results in the conversion of this added oxygen into two hydroxyl radicals, so that one ultimately obtains hydroxylated octadecadiene acid, as indicated by the formula $C_{18}H_{32}(OH)_2O_2$. In other words, the addition product of octadecadiene-acid is the substitution product, at least hypothetically, of the corresponding semi-saturated acid of the composition $C_{18}H_{34}O_2$, i. e., apparently dihydroxy-iso-oleic acid. Complete hydroxylation would apparently form tetrahydroxystearic acid.

As further stated in said De Groote and Keiser patent, it is immaterial whether one oxygen atom is introduced or two hydroxyl radicals are introduced into the octadecadiene acid to produce the oxy-octadecadiene acid body. It is obvious, of course, where a hydroxyl is formed, that one has a hydroxylated fatty acid or hydroxylated fatty acid compound, and that the fatty acid at least may act either as an alcohol or as an acid, in the same sense that ricinoleic acid may act as an alcohol or acid.

In another U. S. Letters Patent to said Melvin De Groote and Bernhard Keiser, No. 2,023,995, dated December 10, 1935, there is disclosed a process for breaking emulsions by means of esters derived by reaction between a dibasic acid of the type $(CH_2)_n(COOH)_2$, in which $n$ has a value of at least 5 and not more than 8, and a hydroxylated fatty body, such as ricinoleic acid, tricinolein, etc. More specifically, the dibasic carboxy acids employed to produce the demulsifying agent used in the process of said last mentioned application for patent includes the following:

Pimelic acid $(HOOC(CH_2)_5COOH)$
Suberic acid $(HOOC(CH_2)_6COOH)$
Azelaic acid $(HOOC(CH_2)_7COOH)$
Sebacic acid $(HOOC(CH_2)_8COOH)$ My present process, as differentiated from the processes of the two De Groote and Keiser patents previously mentioned, is characterized by the fact that in my present process I employ a demulsifying agent of a kind in which there is present in the same molecule, both an oxy-octadecadiene acid residue and a dibasic carboxy acid residue derived from an acid of the type $(CH_2)_n(COOH)_2$, in which $n$ has a value of at least 5 and not more than 8. The formation of such materials is relatively simple, since the oxy-octadecadiene acid may represent the acid alcohol type of reagent. In the same sense that ricinoleic acid is an acid alcohol, one may obtain the same reaction from one molecule of oxy-octadecadiene acid and one molecule of the dibasic carboxy acid as one would obtain from a molecule of ricinoleic acid and a molecule of oxalic acid. Thus, one may form a new acid having two carboxyl radicals by esterification between one of the carboxylic hydrogens of the dibasic carboxy acid and the hydroxyl of the oxy acid. Needless to say, just as one can form a trimolecular acid, such as tri-ricinoleic acid, likewise, one can combine two molecules of oxy-octadecadiene acid with one molecule of a dibasic carboxy acid by reaction involving the two carboxyl radicals of the dibasic acid. Likewise, any other alcohol acid type of material such as ricinoleic acid, hydroxystearic acid, or the condensation product of ethylene glycol with oxalic acid, or phthalic acid, or maleic acid may serve as a bridge or a connecting link by combination with a molecule of oxy-octadecadiene acid and a molecule of a dibasic carboxy acid. Such material used as a connecting link or bridge, of course, must be amphoteric, if it can be employed to combine with a hydroxyl radical of one oxy acid and the carboxyl radical of a dibasic carboxy acid. Obviously, where it combines with the carboxyl of dibasic acid, one may use an oxy acid material in which there is no free carboxyl, such as a salt or ester. Likewise, in any case where a carboxylic hydrogen remains, such carboxylic hydrogen may be converted into salt by neutralization with a suitable base, such as sodium hydroxide, potassium hydroxide, calcium hydroxide, triethanolamine, etc. Such free carboxylic hydrogen may be converted into an ester, such as methyl ester, ethyl ester, propyl ester, or into an aromatic, cyclic or aralkyl ester.

Other means of combination are readily available, such as the formation of a diglyceride in which a molecule of oxy-octadecadiene acid and a molecule of a dibasic carboxy acid is united with a molecule of glycerol, so as to leave one hydroxyl group and one carboxyl group uncombined. Likewise, such reaction could be continued so as to yield a triglyceride free from any uncombined hydroxyl or carboxyl groups. Likewise, two molecules of oxy-octadecadiene acid could be reacted with one molecule of glycerol, and subsequently, further reacted with one molecule of a dibasic carboxy acid, so as to produce a product in which there is a residual carboxyl group. One molecule of oxy-octadecadiene acid and one molecule of a dibasic carboxy acid can be united by means of ethylene glycol or some similar glycol.

As previously stated, where oxy-octadecadiene acid is acting by virtue of its alcoholic hydroxyl, i. e., acting as an alcohol, one need not employ the acid itself, but one may employ any suitable salt, such as a sodium salt, ammonium salt, potassium salt, or an amine salt, such as a triethanolamine salt, etc. Where the oxy acid is acting by virtue of its carboxylic hydrogen, one need not employ the acid itself, but one might employ a combination wherein the alcoholic hydroxyl has already combined with some other acid, such as ricinoleic acid. All these reactions are essentially esterification reactions. Esterification reactions are best promoted at a fairly high temperature, and preferably slightly above the boiling point of water. The passing of dry hydrochloric acid gas hastens the reaction. Any conventional means may be employed to hasten these reactions, such as the passing of dry carbonic acid gas, or any other inert gas through the mixture.

I prepare the treating agent or demulsifying agent employed in my present process in the following manner:

314 lbs. of oxy-octadecadiene acid of technical purity are mixed with 202 lbs. of sebacic acid of technical purity, and after thorough mixing, there is added thereto 92 lbs. of glycerol. The mixture is heated to approximately 110° C. and dry carbon dioxide gas is passed through the mixture with constant stirring, until the acid value remains constant, based on tests of samples taken at hourly intervals. If the reaction does not proceed rapidly enough, a higher temperature, say, 125° to 135° C., may be employed. If desired, dry hydrochloric gas, or even dried air, may be substituted for the dry carbonic acid gas. The product thus obtained forms a very efficient demulsifying agent, especially after dilution with some suitable solvent, so as to reduce its viscosity. One or more of the following will serve as a suitable solvent: benzol, solvent naphtha, kerosene, or propyl alcohol.

If desired, any free acidity which is present in the preferred reagent or demulsifying agent above described, may be neutralized by triethanolamine or by any other suitable amine, such as monoamylamine, benzelamine, etc. The free acidic carboxyl may be converted into a salt, such as sodium, potassium, or ammonium salt. The free acidic carboxyl, of course, may be combined with an alcohol, such as ethyl, methyl, or propyl alcohol, or with glycerol.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or 1 to 30,000, such an apparent insolubility in oil and water is not significant, because said reagents undoubedly have solubility within the concentration employed. This same fact is true in regard to the material or materials employed as the demulsifying agent of my process.

In practicing my process, a treating agent or demulsifying agent of the kind above described is brought into contact with or caused to act upon the emulsion to be treated, in any of the various ways, or by any of the various apparatus now generally used to resolve or break petroleum emulsions with a chemical reagent.

Having thus described my invention, what I claim as new and desire to secure by Letters Patent is:

1. A process for breaking petroleum emulsions of the water-in-oil type, which consists in subjecting the emulsion to the action of a demulsifying agent comprising a chemical compound, characterized by the presence of both an oxy-octadecadiene acid residue and a dicarboxy acid residue in the same molecule; said dicarboxy acid residue being derived from an acid of the formula type $(CH_2)_n(COOH)_2$, in which $n$ has a value of at least 5 and not more than 8.

2. A process for breaking petroleum emulsions of the water-in-oil type, which consists in subjecting the emulsion to the action of a demulsifying agent comprising a chemical compound in the form of a salt, characterized by the presence of both an oxy-octadecadiene acid residue and a dicarboxy acid residue in the same molecule; said dicarboxy acid residue being derived from an acid of the formula type $(CH_2)_n(COOH)_2$, in which $n$ has a value of at least 5 and not more than 8.

3. A process for breaking petroleum emulsions of the water-in-oil type, which consists in subjecting the emulsion to the action of a demulsifying agent comprising a chemical compound in the form of an acid, characterized by the presence of both an oxy-octadecadiene acid residue and a dicarboxy acid residue in the same molecule; said dicarboxy acid residue being derived from an acid of the formula type $(CH_2)_n(COOH)_2$, in which $n$ has a value of at least 5 and not more than 8.

4. A process for breaking petroleum emulsions of the water-in-oil type, which consists in subjecting the emulsion to the action of a demulsifying agent comprising a chemical compound in the form of an ester, characterized by the presence of both an oxy-octadecadiene acid residue and a dicarboxy acid residue in the same molecule; said dicarboxy acid residue being derived from an acid of the formula type $$(CH_2)_n(COOH)_2,$$

in which $n$ has a value of at least 5 and not more than 8.

MELVIN DE GROOTE.